United States Patent
Yang et al.

(10) Patent No.: US 11,375,097 B2
(45) Date of Patent: Jun. 28, 2022

(54) LENS CONTROL METHOD AND APPARATUS AND TERMINAL

(71) Applicant: HUAWEI TECHNOLOGIES CO., LTD., Guangdong (CN)

(72) Inventors: Chuan Yang, Dongguan (CN); Yunju Liu, Shenzhen (CN); Li-Te Kuo, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/136,261

(22) Filed: Dec. 29, 2020

(65) Prior Publication Data

US 2021/0120159 A1  Apr. 22, 2021

Related U.S. Application Data

(63) Continuation of application No. PCT/CN2019/081429, filed on Apr. 4, 2019.

(30) Foreign Application Priority Data

Aug. 10, 2018 (CN) .......................... 201810911839.9

(51) Int. Cl.
*G03B 5/02* (2021.01)
*H04N 5/225* (2006.01)
(Continued)

(52) U.S. Cl.
CPC ........... *H04N 5/2259* (2013.01); *G06T 7/248* (2017.01); *G06T 7/571* (2017.01); *H04N 5/23212* (2013.01); *H04N 5/23287* (2013.01)

(58) Field of Classification Search
CPC ............. H04N 5/2259; H04N 5/23287; H04N 5/23258; H04N 5/232939; H04N 5/23254;
(Continued)

(56) References Cited

U.S. PATENT DOCUMENTS

| 5,953,544 A | 9/1999 | Kai et al. |
|---|---|---|
| 9,232,138 B1 | 1/2016 | Baldwin |

(Continued)

FOREIGN PATENT DOCUMENTS

| CN | 101212570 A | 7/2008 |
|---|---|---|
| CN | 102572277 A | 7/2012 |

(Continued)

OTHER PUBLICATIONS

Cen Yuting, Analysis of Camera Anti-jitter Technology. Light Industry Science and Technology, Jun. 2016, 3 pages.

(Continued)

*Primary Examiner* — Patrick E Demosky
(74) *Attorney, Agent, or Firm* — Womble Bond Dickinson (US) LLP

(57) ABSTRACT

A lens control method is applied to a camera module with an OIS motor. The module includes a lens, an OIS motor, an OIS motor driver module, and an imaging sensor. The method includes: obtaining a first speed and a first direction of a to-be-photographed object in a moving process, an object distance between the to-be-photographed object and the lens, and an image distance between the lens and the imaging sensor; calculating a second speed and a second direction based on the first speed, the first direction, the object distance, and the image distance; and sending a control signal to the OIS motor driver module, so that the OIS motor driver module drives the OIS motor to control the lens to move at the second speed and in the second direction.

9 Claims, 4 Drawing Sheets

(51) Int. Cl.
  *G06T 7/571* (2017.01)
  *G06T 7/246* (2017.01)
  *H04N 5/232* (2006.01)

(58) Field of Classification Search
  CPC .............. H04N 5/23296; H04N 5/2353; H04N 5/2258; H04N 5/23216; H04N 5/23212; G03B 5/02; G03B 15/16; G03B 2205/0007; G06T 7/571; G06T 7/248
  See application file for complete search history.

(56) References Cited

U.S. PATENT DOCUMENTS

| | | | |
|---|---|---|---|
| 2008/0199170 A1 | 8/2008 | Shibuno et al. | |
| 2011/0157380 A1 | 6/2011 | Yamazaki | |
| 2012/0262590 A1 | 10/2012 | Yumiki | |
| 2018/0103208 A1* | 4/2018 | Jung | H04N 5/23222 |
| 2018/0176470 A1* | 6/2018 | Kim | H04N 5/2259 |
| 2019/0028646 A1* | 1/2019 | Wang | H04N 5/2258 |
| 2019/0191088 A1* | 6/2019 | Murashima | H04N 5/23267 |

FOREIGN PATENT DOCUMENTS

| | | | |
|---|---|---|---|
| CN | 102055897 B | | 1/2013 |
| CN | 103905735 A | | 7/2014 |
| CN | 105191283 A | | 12/2015 |
| CN | 106303222 A | | 1/2017 |
| CN | 106780674 A | | 5/2017 |
| CN | 106161942 B | | 11/2017 |
| CN | 107977981 A | | 5/2018 |
| CN | 108259703 A | * | 7/2018 |
| CN | 108259703 A | | 7/2018 |
| CN | 108337381 A | | 7/2018 |
| CN | 105898143 B | | 5/2019 |
| JP | 2008058221 A | | 3/2008 |
| WO | 2005088962 A1 | | 9/2005 |

OTHER PUBLICATIONS

Bart Kofoed et al,"Dynamic Focus Control for Preventing Motion Blur", Published in: 2015 12th IEEE International Conference on Advanced Video and Signal Based Surveillance (AVSS), Date of Conference: Aug. 25-28, 2015, total 6 pages.

* cited by examiner

LENS CONTROL METHOD AND APPARATUS AND TERMINAL

CROSS-REFERENCE TO RELATED APPLICATIONS

This application is a continuation of International Application No. PCT/CN2019/081429, filed on Apr. 4, 2019, which claims priority to Chinese Patent Application No. 201810911839.9, filed on Aug. 10, 2018. The disclosures of the aforementioned applications are hereby incorporated by reference in their entireties.

TECHNICAL FIELD

This application relates to the field of communications technologies, and in particular, to the field of camera technologies.

BACKGROUND

With development of mobile phone camera technologies, photographing effects of consumer electronics products (for example, mobile phones, tablet computers, and wearable cameras) such as mobile phones are becoming more consistent with those of digital single-lens reflex cameras. However, currently, there are still many improvements to be made to photographing effects of mobile phones. For example, because capturing a moving object is limited by a photographing technique of a photographer and a function of a mobile phone camera, it is still difficult to obtain a clear image by capturing a moving object using a mobile phone.

SUMMARY

This application provides a lens control method and apparatus and a terminal that may be used to resolve a problem that a photographed image is unclear when a moving object is photographed.

A hardware environment of the technical solutions of this application needs to depend on an optical image stabilization (OIS) motor of a camera and a drive control circuit thereof, and an OIS image stabilization technology is used. The OIS image stabilization technology means performing mobile phone jitter detection by using a gyroscope, and moving a lens in a reverse direction by using an OIS motor, to compensate for image blurring caused by mobile phone jitter during exposure. The following technical solutions are disclosed in this application:

According to a first aspect, this application provides a lens control method, where the method is applied to a camera module with an OIS motor, the module includes a movable lens, the OIS motor driving the lens to move, an OIS motor driver module, and an imaging sensor configured to obtain an image of a to-be-photographed object, and the method includes:

obtaining a first speed and a first direction of the to-be-photographed object in a moving process, an object distance between the to-be-photographed object and the lens, and an image distance between the lens and the imaging sensor, where the first speed is a speed at which the to-be-photographed object moves, and the first direction is a moving direction in which the to-be-photographed object moves at the first speed; calculating a second speed and a second direction based on the first speed, the first direction, the object distance, and the image distance; and sending a control signal to the OIS motor driver module, so that the OIS motor driver module drives the OIS motor to control the lens to move at the second speed and in the second direction.

The second speed is a speed at which the lens needs to move when following the to-be-photographed object, and the second direction is a direction in which the lens moves at the second speed.

In this aspect, the camera module with an OIS motor is used to capture the to-be-photographed object in the moving process, and the capturing process is used to automatically capture the moving object. The second speed and the second direction required by the lens for movement are determined by using the first speed and direction used for movement of the to-be-photographed object, the object distance, and the image distance, and then the lens is driven by the OIS motor in the camera module to move at the second speed and in the second direction, to track the to-be-photographed object, so that a clear and background-stretched image of the to-be-photographed object can be photographed.

With reference to the first aspect, in an embodiment, the obtaining a first speed and a first direction of the to-be-photographed object in a moving process includes: obtaining a first frame of image of the to-be-photographed object that is photographed at a first moment and a second frame of image of the to-be-photographed object that is photographed at a second moment, where a time interval between the first moment and the second moment is t; extracting at least one feature point from the first frame of image, and generating a first coordinate set from at least one pair of coordinates corresponding to the at least one feature point; extracting at least one pair of coordinates of at least one feature point at a same location from the second frame of image, and generating a second coordinate set; and determining the first speed and the first direction of the to-be-photographed object based on the first coordinate set, the second coordinate set, and the time interval t.

In an embodiment, the two frames of images of the to-be-photographed object that are photographed at the first moment and the second moment are photographed, then the first coordinate set and the second coordinate set are separately obtained from the two frames of images, and the first speed and the first direction are finally accurately determined. The first speed and the first direction of the to-be-photographed object can be accurately determined based on the coordinate sets of the feature points, so that accurate calculation data is provided for subsequent calculation of the second speed and the second direction.

With reference to the first aspect, in an embodiment, the object distance between the to-be-photographed object and the lens includes an object distance $d_2$ between the to-be-photographed object and the lens at the second moment, and the image distance between the lens and the imaging sensor includes an image distance v between the lens and the imaging sensor at the second moment; and the calculating a second speed and a second direction based on the first speed, the first direction, the object distance, and the image distance includes:

calculating the second speed and the second direction according to the following relational expression:

$$\vec{V2} = \frac{v}{v+d_2}\vec{V1},$$

where $\overrightarrow{V2}$ indicates the second speed and the second direction, and $\overrightarrow{V1}$ indicates the first speed and the first direction.

In an embodiment, the second speed and the second direction can be calculated by using the foregoing relational expression, so that the OIS motor controls the lens to move at the calculated second speed and in the second direction. Because the object distance, the image distance, and the first speed and the first direction of the to-be-photographed object are considered during calculation, a suitable and accurate second speed and second direction can be calculated.

With reference to the first aspect, in an embodiment, the object distance between the to-be-photographed object and the lens includes an object distance $d_1$ between the to-be-photographed object and the lens at the first moment and an object distance $d_2$ between the to-be-photographed object and the lens at the second moment, and the image distance between the lens and the imaging sensor includes an image distance v between the lens and the imaging sensor at the second moment; and the calculating a second speed and a second direction based on the first speed, the first direction, the object distance, and the image distance includes:

calculating, according to the following relational expression, an included angle θ between the first direction and a plane on which the lens is located:

$$\theta = \arcsin\left(\frac{d_2 - d_1}{|\overrightarrow{V1}|}\right);$$

and calculating the second speed and the second direction according to the following relational expression:

$$\overrightarrow{V2} = \frac{v}{v + d_2}\overrightarrow{V1}\cos\theta,$$

where $\overrightarrow{V2}$ indicates the second speed and the second direction, and $\overrightarrow{V1}$ indicates the first speed and the first direction.

In an embodiment, the second speed and the second direction are corrected based on the included angle between the first direction and the plane on which the lens is located, so that when the to-be-photographed object moves away from or close to the lens, the lens can still track the to-be-photographed object when moving at the second speed and in second direction, and therefore, a clear and background-stretched image of the to-be-photographed object can be photographed.

With reference to the first aspect, in an embodiment, the obtaining an object distance between the to-be-photographed object and the lens and an image distance between the lens and the imaging sensor includes: controlling the lens to automatically focus on the to-be-photographed object; and obtaining an object distance between the to-be-photographed object and the lens after focusing and an image distance between the lens and the imaging sensor after focusing.

In embodiment, the lens is controlled to automatically focus on the to-be-photographed object, so that a clear image of the to-be-photographed object can be photographed. In addition, an accurate object distance and image distance can be obtained after focusing.

According to a second aspect, this application further provides a lens control apparatus, where the apparatus includes units configured to perform the method operations in the first aspect and the embodiments of the first aspect. The apparatus includes an obtaining unit, a processing unit, and a sending unit, and in addition, may further include another unit or module such as a storage unit.

According to a third aspect, this application further provides a terminal, where the terminal includes a camera module with an optical image stabilization OIS motor and a processor, and the module includes a movable lens, the OIS motor driving the lens to move, an OIS motor driver module, and an imaging sensor configured to obtain an image of a to-be-photographed object.

The processor is configured to implement the method in the first aspect and the embodiments of the first aspect, and output a control signal to the module; and the module is configured to receive the control signal from the processor, and send the control signal to the OIS motor driver module, so that the OIS motor driver module drives the OIS motor to control the lens to move at a second speed and in a second direction.

According to a fourth aspect, this application further provides a computer storage medium. The computer storage medium may store a program, and when the program is executed, the first aspect and various embodiments of the first aspect may be implemented, including some or all of the operations in the embodiments of the lens control method provided in this application.

According to a fifth aspect, this application further provides a computer program product. The computer program product includes one or more computer instructions such as a device upgrade instruction. When the computer program is loaded and executed on a computer, some or all of the operations in the embodiments of the lens control method provided in this application may be implemented.

According to the lens control method and apparatus and the terminal provided in this application, the camera module with an OIS motor is used to capture the to-be-photographed object in the moving process, and the capturing process is used to automatically capture the moving object. The second speed and the second direction required by the lens for movement are determined by using the first speed and direction used for movement of the to-be-photographed object, the object distance, and the image distance, and then the lens is driven by the OIS motor in the camera module to move on a horizontal plane at the second speed and in the second direction, to track the to-be-photographed object, so that a clear and vivid image can be photographed. In this process, a clear and complete image can be photographed without a need to manually move the lens to follow the to-be-photographed object, and it is easy to implement without increasing material costs.

DESCRIPTION OF EMBODIMENTS

Before the technical solutions in the embodiments of this application are described, the technical terms and application scenarios involved in the embodiments of this application are described.

Figure 1:
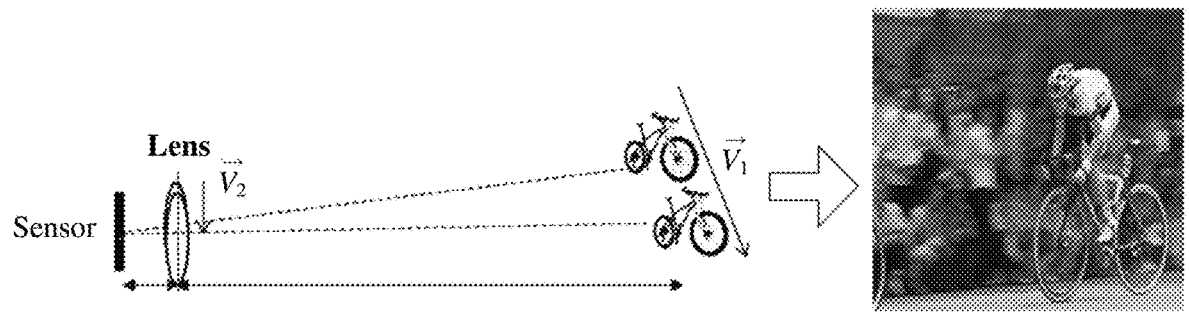
FIG. 1 is a schematic diagram of an effect of tracking a to-be-photographed object by a lens according to an embodiment of this application.

The technical solutions provided in the embodiments of this application are applied to existing consumer electronics products with OIS image stabilization motor included in a camera. With reference to the method for capturing a moving object provided in this application, an OIS motor drives a lens to move, to track a to-be-photographed moving object, so that an effect of a clear and background-stretched image of the to-be-photographed moving object can be achieved, as shown in FIG. 1, for example.

Before the technical solutions of this application are described, a structure and a working principle of a camera module with an optical image stabilization OIS motor are briefly described. The camera module may be a camera module on a terminal, for example, an electronic device such as a mobile phone, a tablet computer, a multimedia playback device, or a laptop computer.

An optical image stabilization technology is as follows: When a user uses a handheld terminal to take a photograph, a gyroscope detects a slight hand jitter signal and transmits the signal to a microprocessor, the microprocessor immediately calculates a displacement amount that needs to be compensated, and then an OIS motor compensation lens set performs compensation based on a lens jitter direction and the displacement amount, so as to effectively eliminate image blurring caused by the camera jitter.

Figure 2:
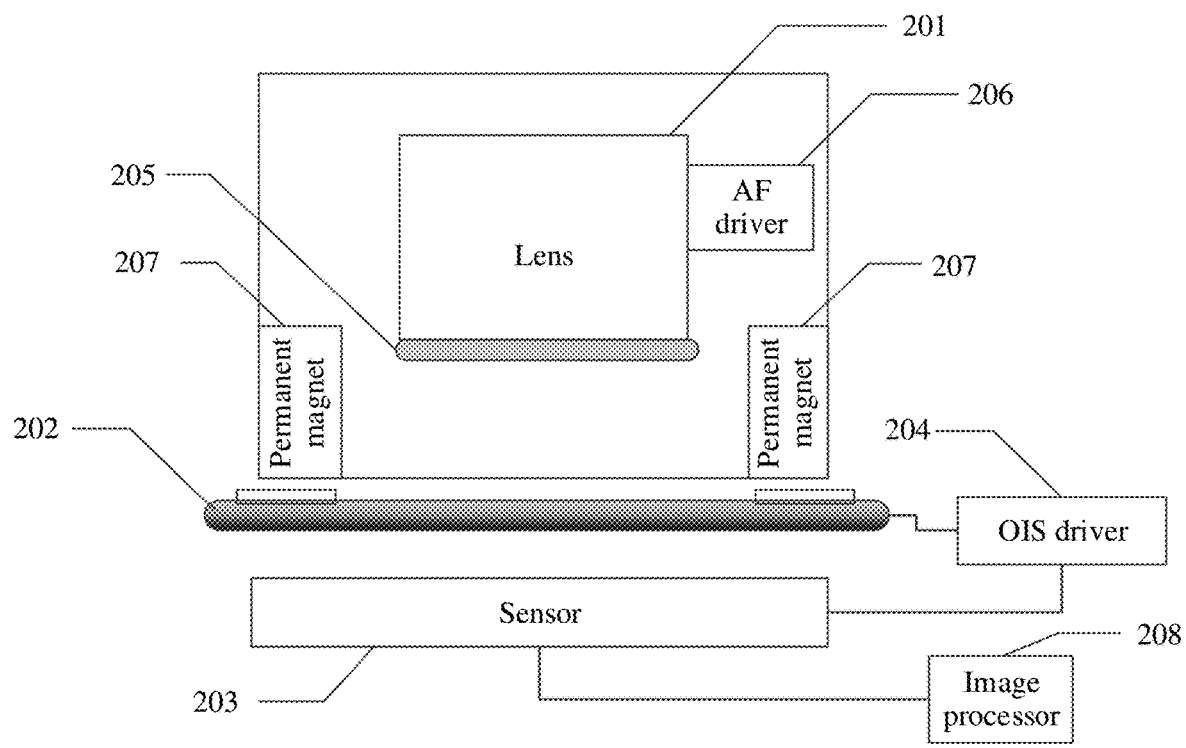
FIG. 2 is a schematic diagram of a structure of a camera module with an optical image stabilization OIS motor according to an embodiment of this application.

FIG. 2 is a schematic diagram of a structure of a camera module with an optical image stabilization OIS motor. The module includes a lens 201, an optical image stabilization (OIS) motor 202, an imaging sensor 203, and an OIS motor driver (OIS Driver) module 204.

In an embodiment, the module further includes an auto focus (AF) motor 205, an AF motor driver (AF Driver) module 206, a permanent magnet 207, and an image processor 208.

The OIS motor 202 is configured to: when a current is applied to the OIS motor, drive the permanent magnet 207 to move on two axes on a horizontal plane, so as to drive the lens 201 to move on the horizontal plane. The OIS motor driver module 204 is configured to drive the OIS motor to drive the lens 201 to move on the horizontal plane.

The imaging sensor 203, which may also be referred to as an image sensor or a sensor, is configured to collect image data. The imaging sensor 203 is fastened to a substrate of the camera module, and performs imaging after reflected light of a to-be-photographed object passes through the lens 201.

The lens 201, which may also be referred to as a camera optical lens, may be driven by the OIS motor 202 to move on the horizontal plane.

In an embodiment, the lens 201 may be further driven by the AF motor 205 to move in a vertical direction, so as to implement an auto focus function. When a current is applied to the AF motor 205, the permanent magnet 207 moves in the vertical direction, so as to drive the lens 201 to move in the vertical direction. The AF motor driver module 206 is configured to drive the AF motor 205 to drive the lens 201 to move in the vertical direction.

In an embodiment, the image processor 208 is configured to: obtain an image or image data collected by the imaging sensor 203, and process the image based on a setting or a user requirement.

In the technical solutions of this application, a camera module with an OIS motor and the lens control method provided in this application are used to capture a moving object to obtain a clear and background-stretched image of the to-be-photographed object. The method provided in this application is applicable to a scenario of photographing a moving object and recording a video.

In an embodiment, the technical solutions of this application may further include but are not limited to the following two technical scenarios:

1. A surveillance camera in the security protection field locks and captures a suspicious moving object.

2. A license plate is locked and captured in the license plate identification field.

When a vehicle runs at a high speed, a clear image of the moving vehicle may be photographed by using the technical solutions of this application, so as to identify a license plate of the vehicle.

The following describes in detail the lens control method provided in the embodiments of this application with reference to the accompanying drawings.

Figure 3:
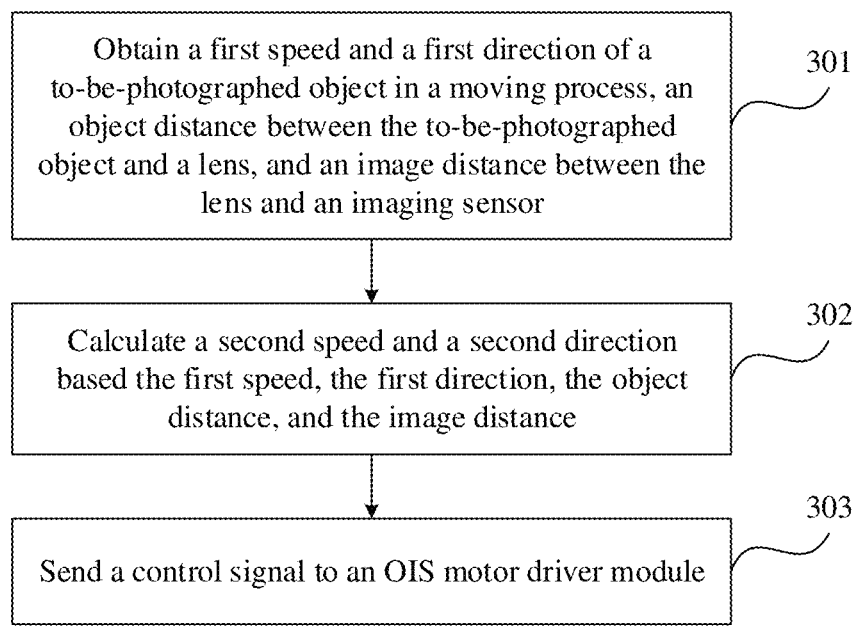
FIG. 3 is a flowchart of a lens control method according to an embodiment of this application.

As shown in FIG. 3, an embodiment provides a lens control method. The method is applied to a camera module with an OIS motor, and the module includes a movable lens, the OIS motor driving the lens to move, an OIS motor driver module, and an imaging sensor configured to obtain an image of a to-be-photographed object.

The method may be performed by a processing module or a processor. In an embodiment, the processing module or the processor may be disposed outside the camera module with an OIS motor. For example, when the processor is disposed inside the camera module, the processor is the image processor 208, or when the processor is disposed outside the camera module, the processor is a central processing unit.

The method includes the following operations. Operation 301: Obtain a first speed and a first direction of the to-be-photographed object in a moving process, an object distance between the to-be-photographed object and the lens, and an image distance between the lens and the imaging sensor.

The first speed is a speed at which the to-be-photographed object moves, and the first direction is a moving direction in which the to-be-photographed object moves at the first speed.

Before photographing, the processor obtains the first speed and the first direction of the to-be-photographed object in a moving state, the object distance between the to-be-photographed object and the lens, and the image distance between the lens and the imaging sensor. The object distance between the to-be-photographed object and the lens and the image distance between the lens and the imaging sensor may be object distances and image distances at a plurality of moments, or may be an object distance and an image distance at a single moment.

The obtaining an object distance between the to-be-photographed object and the lens and an image distance between the lens and the imaging sensor includes: controlling the lens to automatically focus on the to-be-photographed object; and obtaining an object distance between the to-be-photographed object and the lens after focusing and an image distance between the lens and the imaging sensor after focusing.

A principle of light reflection of an object is used for focusing. The sensor receives reflected light of the to-be-photographed object, collects an image or image data, and then transmits the image or the image data to the processor. The processor generates a focusing instruction based on the received content, and sends the instruction to the AF motor driver module, so that the AF motor driver module drives the AF motor to drive the lens to move, so as to perform focusing. Because the focusing process is performed without a user operation, the focusing process is also referred to as auto focusing.

In an embodiment, in operation 301, the obtaining a first speed and a first direction of the to-be-photographed object in a moving process includes: obtaining a first frame of image of the to-be-photographed object that is photographed at a first moment and a second frame of image of the to-be-photographed object that is photographed at a second moment, where a time interval between the first moment and the second moment is t; extracting at least one feature point from the first frame of image, and generating a first coordinate set from at least one pair of coordinates corresponding to the at least one feature point; extracting at least one pair of coordinates of at least one feature point at a same location from the second frame of image, and generating a second coordinate set; and determining the first speed and the first direction of the to-be-photographed object based on the first coordinate set, the second coordinate set, and the time interval t.

The processor obtains the two frames of images of the to-be-photographed object that are photographed at the first moment and the second moment, then separately obtains the first coordinate set and the second coordinate set from the two frames of images, and finally accurately determines the first speed and the first direction, so that accurate calculation data is provided for subsequent calculation of a second speed and a second direction.

Operation 302: Calculate the second speed and the second direction based on the first speed, the first direction, the object distance, and the image distance.

The processor may calculate the second speed and the second direction in the following two embodiments.

In an embodiment, an object distance $d_2$ between the to-be-photographed object and the lens at the second moment is obtained, and the image distance between the lens and the imaging sensor includes an image distance v between the lens and the imaging sensor at the second moment.

The calculating the second speed and the second direction based on the first speed, the first direction, the object distance, and the image distance includes: calculating the second speed and the second direction according to the following relational expression:

$$\vec{V2} = \frac{v}{v+d_2}\vec{V1},$$

where
$\vec{V2}$ indicates the second speed and the second direction, and $\vec{V1}$ indicates the first speed and the first direction.

In an embodiment, an object distance $d_1$ between the to-be-photographed object and the lens at the first moment and an object distance $d_2$ between the to-be-photographed object and the lens at the second moment are obtained, and the image distance between the lens and the imaging sensor includes an image distance v between the lens and the imaging sensor at the second moment.

The calculating the second speed and the second direction based on the first speed, the first direction, the object distance, and the image distance includes: calculating, according to the following relational expression, an included angle θ between the first direction and a plane on which the lens is located:

$$\theta = \arcsin\left(\frac{d_2-d_1}{|\vec{V1}|}\right);$$

and
calculating the second speed and the second direction according to the following relational expression:

$$\vec{V2} = \frac{v}{v+d_2}\vec{V1}\cos\theta,$$

where
$\vec{V2}$ indicates the second speed and the second direction, and $\vec{V1}$ indicates the first speed and the first direction.

In addition, in this embodiment of this application, the second speed and the second direction may be calculated in another manner. This is not limited in this application.

Operation 303: Send a control signal to the OIS motor driver module.

The processor sends the control signal to the OIS motor driver module, so that the OIS motor driver module drives the OIS motor to control the lens to move at the second speed and in the second direction. Because the second speed and the second direction are calculated based on the first speed and the first direction, the lens can always be aligned with the to-be-photographed object when moving at the second speed and in the second direction.

According to the solution provided in this embodiment of this application, the camera module with an optical image stabilization OIS motor is used to capture the to-be-photographed object in the moving process, and the capturing process is used to automatically capture the moving object. The second speed and the second direction required by the lens for movement are determined by using the first speed and direction used for movement of the to-be-photographed object, the object distance, and the image distance, and then the lens is driven by the OIS motor in the camera module to move on two axes on the horizontal plane, to track the to-be-photographed object, so that a clear and background-stretched image of the to-be-photographed object can be photographed.

Figure 4:
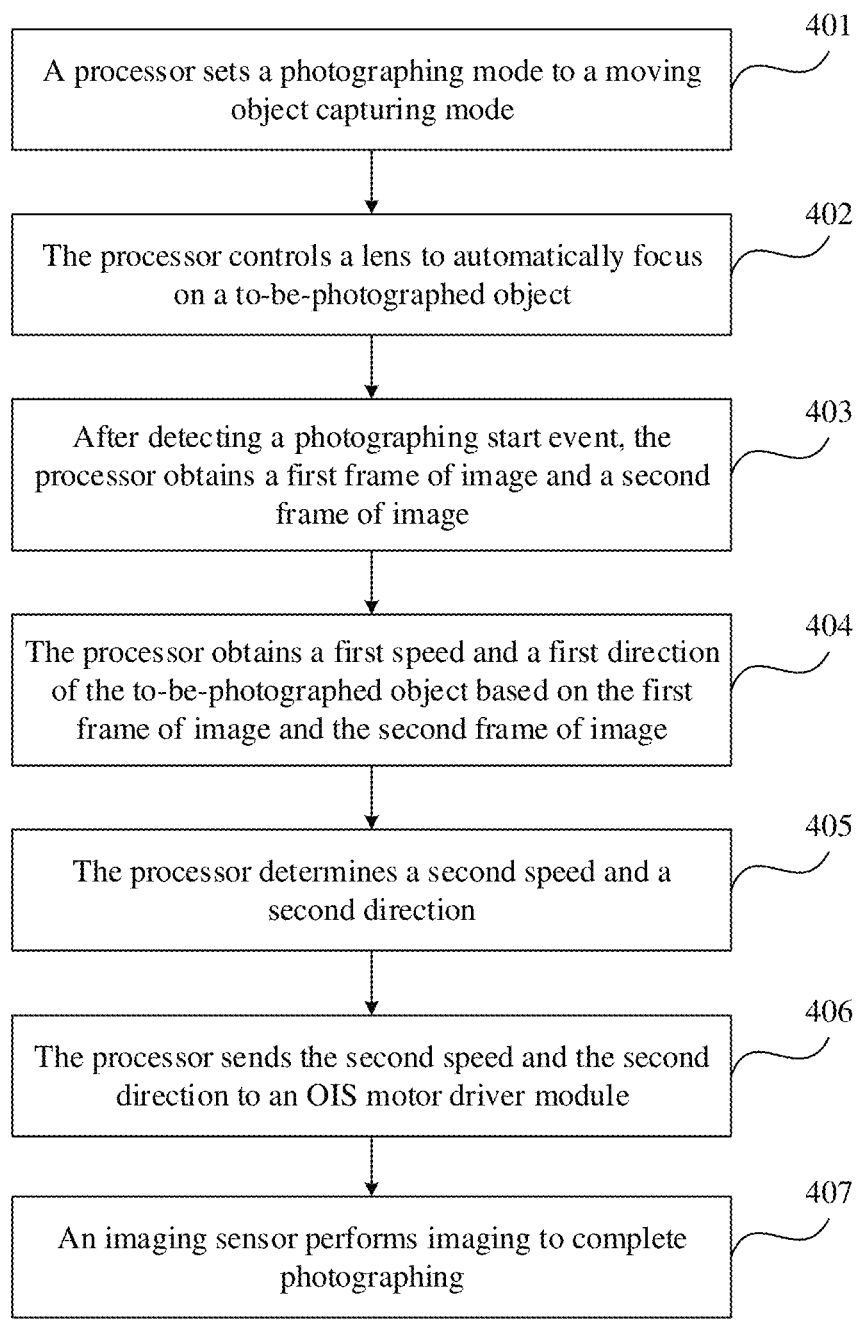
FIG. 4 is a flowchart of another lens control method according to an embodiment of this application.

In a specific embodiment, FIG. 4 is a flowchart of a lens control method according to another embodiment of this application.

Operation 401: A processor sets a photographing mode to a moving object capturing mode.

When a user needs to perform photographing, the processor first sets the photographing mode. For example, when an object that needs to be photographed is a moving object, the processor sets the photographing mode to the moving object capturing mode. The moving object capturing mode is a photographing mode of photographing a moving object.

Further, the processor may set the photographing mode to the moving object capturing mode based on selection of the user. For example, if the user selects the moving object capturing mode from a photographing menu, correspondingly, the processor sets the photographing mode to the moving object capturing mode.

In addition, the processor may further automatically identify a photographing scene and a to-be-photographed object, and then automatically perform setting based on an identification result. For example, if the processor identifies, by using an artificial intelligence and image recognition technology, that the to-be-photographed object is a moving object, the processor sets the photographing mode to the moving object capturing mode.

Operation 402: The processor controls a lens to automatically focus on the to-be-photographed object.

An imaging sensor receives reflected light of the to-be-photographed object, collects an image or image data, and then transmits the image or the image data to the processor. The processor generates a focusing instruction based on the received content, and sends the instruction to an AF motor driver module. The AF motor driver module drives an AF motor to drive the lens to move for focusing. Because a focal length of the lens remains unchanged, focusing actually means changing an object distance and an image distance by moving the lens. Therefore, after controlling the lens to focus, the processor obtains an object distance and an image distance based on a distance between the to-be-photographed object and the lens and a distance between the lens and the imaging sensor after focusing.

In an embodiment, after focusing, the processor determines the object distance between the to-be-photographed object and the lens based on a depth value of a pixel in the image or the image data generated by the imaging sensor. Finally, the processor determines the image distance between the lens and the imaging sensor based on the focal length of the lens and a relationship between the object distance, the image distance, and the focal length.

It should be noted that during photographing, focusing is performed on the to-be-photographed object in real time. Before the photographing is completed, the processor continuously controls the lens to focus on the to-be-photographed object, and in addition, the processor may obtain the object distance and the image distance in real time.

Operation 403: After detecting a photographing start event, the processor obtains a first frame of image and a second frame of image.

The photographing start event is an event triggered when the user performs the photographing operation. For example, if the user clicks a photographing button, correspondingly, the processor detects the photographing start event. The processor obtains the first frame of image of the to-be-photographed object that is photographed at a first moment and the second frame of image of the to-be-photographed object that is photographed at a second moment. A time interval between the first moment and the second moment is t. For example, t is 30 milliseconds.

The first frame of image and the second frame of image may be generated by the processor based on the image data sent by the imaging sensor, or may be directly sent by the imaging sensor to the processor.

Operation 404: The processor obtains a first speed and a first direction of the to-be-photographed object based on the first frame of image and the second frame of image.

The processor extracts at least one feature point from the first frame of image, generates a first coordinate set from at least one pair of coordinates corresponding to the at least one feature point, extracts at least one pair of coordinates of at least one feature point at a same location from the second frame of image, and generates a second coordinate set.

The feature point may be a series of points representing a feature of the to-be-photographed object. For example, when the to-be-photographed object is a person, the nose, glasses, and the mouth of the face of the person may be extracted as feature points. Coordinates of a feature point are coordinates of the feature point on a plane on which the feature point is located, and the plane is parallel to a plane on which the lens is located.

In addition, pairs of coordinates in the first coordinate set are in a one-to-one correspondence with pair of coordinates in the second coordinate set, and each group of corresponding pairs of coordinates represent coordinates of one feature point at the first moment and the second moment. In an embodiment, the processor may determine the to-be-photographed object based on a smear boundary, and then extract the feature point of the to-be-photographed object. For a process in which the processor determines the smear boundary of the photographed frames of image and determines the feature point of the to-be-photographed object based on the smear boundary, reference may be made to an existing process. This is not described in detail in this embodiment.

The processor determines the first speed and the first direction of the to-be-photographed object based on the first coordinate set, the second coordinate set, and the time interval t. The processor determines a displacement distance and a displacement direction of each feature point based on the first coordinate set and the second coordinate set, and then calculates the first speed and the first direction based on the time interval t.

For example, n feature points are selected, and n is an integer greater than or equal to 1.

The first coordinate set is $[(x_1, y_1), (x_2, y_2), \cdots, (x_n, y_n)]$, and the second coordinate set is $[(x_1', y_1'), (x_2', y_2'), \cdots, (x_n', y_n')]$, where $(x_n, y_n)$ indicates coordinates of the $n^{th}$ feature point in the first frame of image, and $(x_n', y_n')$ indicates coordinates of the feature point in the second frame of image.

According to the following relational expressions $$x_d = [(x_1 - x_1') + (x_2 - x_2') + \cdots + (x_n - x_n')]/n; \text{ and}$$

$$y_d = [(y_1 - y_1') + (y_2 - y_2') + \cdots + (y_n - y_n')]/n,$$

$[x_d, y_d]$ is calculated.

Absolute values of $x_d$ and $y_d$ indicate a displacement of the to-be-photographed object, and a positive/negative sign indicates a moving direction of the to-be-photographed object, namely, the first direction. Then $[x_d, y_d]$ is divided by the time interval t, to finally obtain $\overrightarrow{V1}$, namely, the first speed and the first direction, as shown in the following relational expression:

$$\overrightarrow{V1} = \begin{bmatrix} V1_x \\ V1_y \end{bmatrix} = \begin{bmatrix} \dfrac{x_d}{t} \\ \dfrac{y_d}{t} \end{bmatrix},$$

where $V1_x$ indicates a component of $\vec{V1}$ on the X-axis, and $V1_y$ indicates a component of $\vec{V1}$ on the Y-axis.

The first speed is a speed at which the to-be-photographed object moves, and the first direction is a moving direction in which the to-be-photographed object moves at the first speed.

Operation 405: The processor determines a second speed and a second direction, where the second speed is a speed at which the lens needs to move when following the to-be-photographed object, and the second direction is a direction in which the lens moves at the second speed.

The processor calculates the second speed and the second direction based on the first speed and the first direction and the obtained object distance and image distance. The object distance and the image distance are obtained by the processor in real time in the real-time focusing process.

In an embodiment, the distance between the to-be-photographed object and the lens remains unchanged in the photographing process. In this case, the obtained object distance is an object distance $d_2$ between the to-be-photographed object and the lens at the second moment, and the obtained image distance is an image distance $v$ between the lens and the imaging sensor at the second moment.

The processor calculates the second speed and the second direction according to the following relational expression:

$$\vec{V2} = \frac{v}{v+d_2}\vec{V1},$$

where $\vec{V2}$ indicates the second speed and the second direction, and $\vec{V1}$ indicates the first speed and the first direction.

In an embodiment, the distance between the to-be-photographed object and the lens changes.

Figure 5:
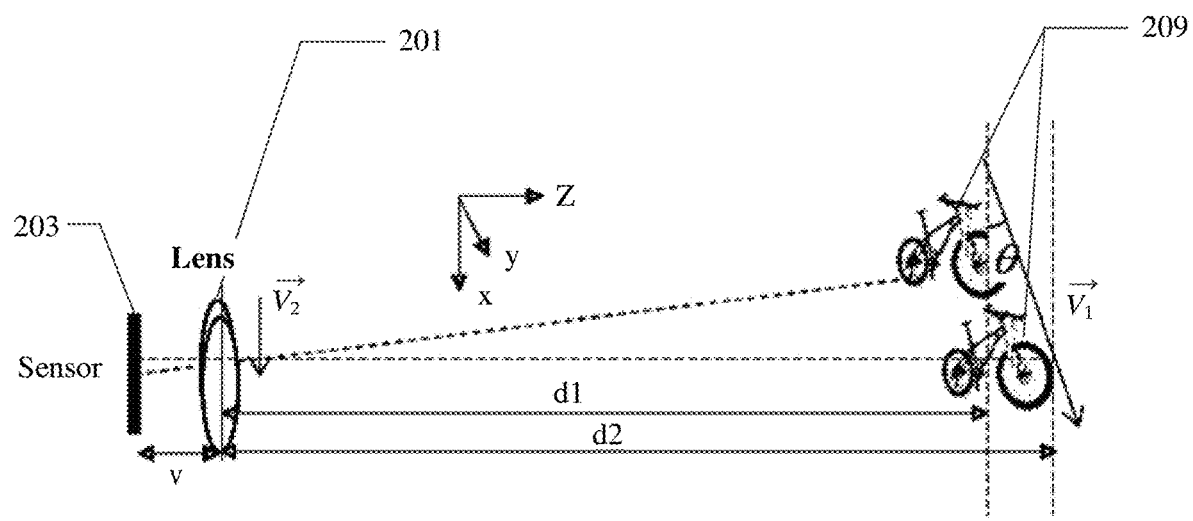
FIG. 5 is a schematic diagram of a photographing a moving object according to an embodiment of this application.

For example, as shown in FIG. 5, a distance between a to-be-photographed object 209 and a lens 201 changes in a photographing process. An included angle between the first direction and a plane on which the lens 201 is located is θ. Because the to-be-photographed object 209 moves away from or close to the lens 201 at the angle θ, the processor needs to correct $\vec{V1}$.

In this case, the obtained object distance includes an object distance $d_1$ between the to-be-photographed object 209 and the lens 201 at the first moment and an object distance $d_2$ between the to-be-photographed object 209 and the lens 201 at the second moment, and the obtained image distance is an image distance $v$ between the lens 201 and an imaging sensor 203 at the second moment.

The processor first calculates the angle θ according to the following relational expression:

$$\theta = \arcsin\left(\frac{d_2 - d_1}{|\vec{V1}|}\right)$$

In an embodiment, $|\vec{V1}|$ is calculated according to the following relational expression:

$$|\vec{V1}| = \sqrt{\left(\frac{x_d}{t}\right)^2 + \left(\frac{y_d}{t}\right)^2}$$

Then the second speed and the second direction are calculated according to the following relational expression:

$$\vec{V2} = \frac{v}{v+d_2}\vec{V1}\cos\theta,$$

where $\vec{V2}$ indicates the second speed and the second direction, and $\vec{V1}$ indicates the first speed and the first direction.

When $\vec{V1}$ is indicated by the components on the X-axis and the Y-axis, $\vec{V2}$ is also indicated by components on the X-axis and the Y-axis, as shown in the following relational expression:

$$\vec{V2} = \begin{bmatrix} V2_x \\ V2_y \end{bmatrix} = \frac{v}{v+d_2}\begin{bmatrix} V1_x\cos\theta \\ V1_y\cos\theta \end{bmatrix},$$

where $V2_x$ indicates a component of $\vec{V2}$ on the X-axis, and $V2_y$ indicates a component of $\vec{V2}$ on the Y-axis.

In this embodiment, in the calculation process, the first speed and the first direction are corrected based on the angle, so that a second speed and a second direction that are applicable to a case in which the to-be-photographed object moves away from or close to the lens can be calculated for the case in which the to-be-photographed object moves away from or close to the lens, and therefore, a clearer and more vivid image can be photographed.

Operation 406: The processor sends the second speed and the second direction to the OIS motor driver module.

The processor sends a control signal to the OIS motor driver module. The control signal is used to instruct the OIS motor driver module to drive the OIS motor. The control signal includes the second speed and the second direction, so that the OIS motor driver module drives the OIS motor to control the lens to move at the second speed and in the second direction.

Operation 407: The imaging sensor performs imaging to complete photographing.

The OIS motor driver module drives the OIS motor to control the lens to move at the second speed and in the second direction, so that the lens can follow the to-be-photographed object. In this case, the imaging sensor performs imaging to complete photographing of the to-be-photographed object. Because the lens follows the to-be-photographed object during photographing, a clear and complete to-be-photographed object can be photographed, so that a clear and background-blurry image of the to-be-photographed object can be obtained.

In the solution provided in this embodiment of this application, a camera module with an OIS motor is used to capture the to-be-photographed object in the moving process, and the capturing process is used to automatically capture the moving object. The second speed and the second direction required by the lens for movement are determined by using the first speed and direction used for movement of the to-be-photographed object, the object distance, and the image distance, and then the lens is driven by the OIS motor in the camera module to move on a horizontal plane at the second speed and in the second direction, to track the to-be-photographed object, so that a clear and vivid image can be photographed. Because a common commercial OIS motor is used, no material costs are increased, performance is reliable, and it is easy to implement.

In addition, while no hardware costs are increased, functions of the camera module with an OIS motor can be further expanded based on preferences of the user, for example, more photographing selection modes are added, thereby bringing more photographing fun and higher photographing experience to the user.

Figure 6:
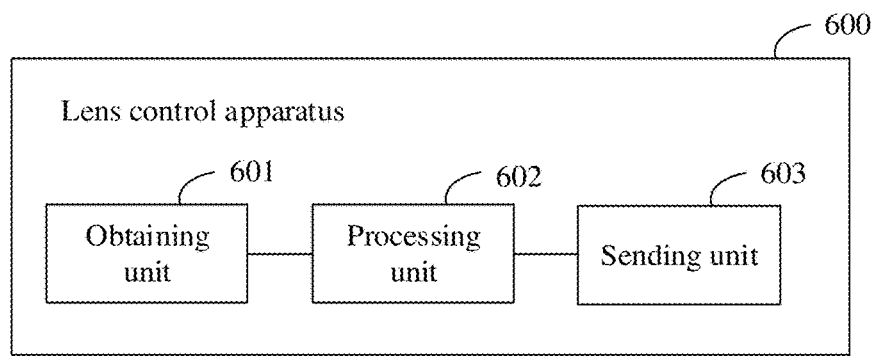
FIG. 6 is a schematic block diagram of a lens control apparatus according to an embodiment of this application.

FIG. 6 is a schematic diagram of a structure of a lens control apparatus according to an embodiment of this application. The lens control apparatus 600 includes an obtaining unit 601, a processing unit 602, and a sending unit 603. In addition, the lens control apparatus 600 may further include another function module or unit, configured to perform the lens control method in the foregoing embodiment.

In an embodiment, the lens control apparatus 600 in this embodiment may be the processor or the processing unit in the foregoing embodiment, or may be disposed in the processor in the foregoing method embodiment.

The obtaining unit 601 is configured to obtain a first speed and a first direction of a to-be-photographed object in a moving process, an object distance between the to-be-photographed object and a lens, and an image distance between the lens and an imaging sensor.

The processing unit 602 is configured to calculate a second speed and a second direction based on the first speed, the first direction, the object distance, and the image distance.

The sending unit 603 is configured to send a control signal to an OIS motor driver module, so that the OIS motor driver module drives an OIS motor to control the lens to move at the second speed and in the second direction.

In an embodiment, the sending unit 603 may be integrated into the processing unit 602, so that the processing unit 602 has functions of the sending unit 603; or the processing unit 602 and the sending unit 603 are integrated into one driver unit. This is not limited in this embodiment.

According to the apparatus provided in this embodiment of this application, a camera module with an OIS motor is used to capture the to-be-photographed object in the moving process, and the capturing process is used to automatically capture the moving object. The second speed and the second direction required by the lens for movement are determined by using the first speed and direction used for movement of the to-be-photographed object, the object distance, and the image distance, and then the lens is driven by the OIS motor in the camera module to move at the second speed and in the second direction, to track the to-be-photographed object, so that a clear and background-stretched image of the to-be-photographed object can be photographed.

In an embodiment, the obtaining unit 601 is configured to: obtain a first frame of image of the to-be-photographed object that is photographed at a first moment and a second frame of image of the to-be-photographed object that is photographed at a second moment, where a time interval between the first moment and the second moment is t; extract at least one feature point from the first frame of image, and generate a first coordinate set from at least one pair of coordinates corresponding to the at least one feature point; extract at least one pair of coordinates of at least one feature point at a same location from the second frame of image, and generate a second coordinate set; and determine the first speed and the first direction of the to-be-photographed object based on the first coordinate set, the second coordinate set, and the time interval t.

In an embodiment, in a case of an object distance $d_2$ between the to-be-photographed object and the lens at the second moment and an image distance $v$ between the lens and the imaging sensor at the second moment, the processing unit 602 is configured to calculate the second speed and the second direction according to the following relational expression:

$$\vec{V2} = \frac{v}{v+d_2}\vec{V1},$$

where $\vec{V2}$ indicates the second speed and the second direction, and $\vec{V1}$ indicates the first speed and the first direction.

In an embodiment, in a case of an object distance $d_1$ between the to-be-photographed object and the lens at the first moment, an object distance $d_2$ between the to-be-photographed object and the lens at the second moment, and an image distance $v$ between the lens and the imaging sensor at the second moment, the processing unit 602 is configured to:

calculate, according to the following relational expression, an included angle $\theta$ between the first direction and a plane on which the lens is located:

$$\theta = \arcsin\left(\frac{d_2 - d_1}{|\vec{V1}|}\right);$$

and calculate the second speed and the second direction according to the following relational expression:

$$\vec{V2} = \frac{v}{v+d_2}\vec{V1}\cos\theta,$$

where $\vec{V2}$ indicates the second speed and the second direction, and $\vec{V1}$ indicates the first speed and the first direction.

In an embodiment, the obtaining unit 601 is configured to: control the lens to automatically focus on the to-be-photographed object; and obtain an object distance between the to-be-photographed object and the lens after focusing and an image distance between the lens and the imaging sensor after focusing.

In addition, the obtaining unit 601, the processing unit 602, and the sending unit 603 are further configured to perform the operations in the foregoing method embodiment shown in FIG. 4.

It may be understood that, to achieve the foregoing functions, the lens control apparatus includes a corresponding hardware structure and/or software unit for performing each function. With reference to the units and algorithm operations described in the embodiments disclosed in this application, embodiments of this application can be implemented in a form of hardware or hardware and computer software. Whether a function is performed by hardware or hardware driven by computer software depends on particular applications and design constraints of the technical solutions.

A person skilled in the art may use different methods to implement the described functions for each particular application, but it should not be considered that the implementation falls beyond the scope of the technical solutions in the embodiments of this application.

Figure 7:
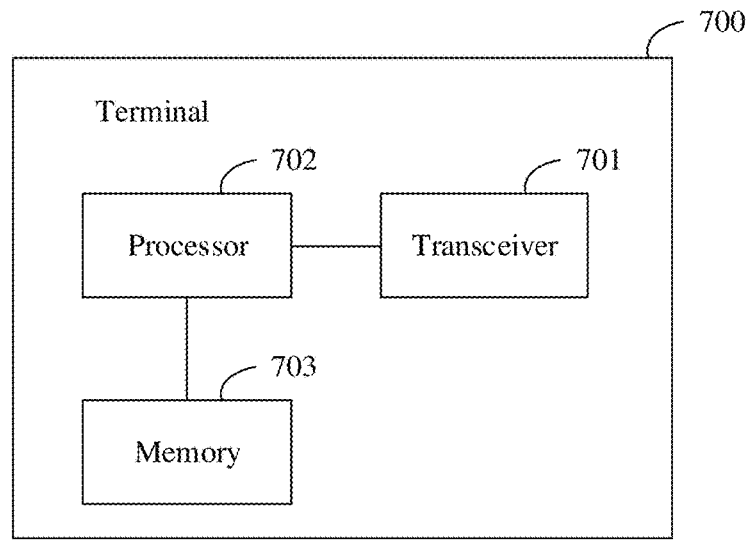
FIG. 7 is a schematic diagram of a structure of a terminal according to an embodiment of this application.

In an embodiment, as shown in FIG. 7, this application further provides a terminal. The terminal 700 may be the camera module with an OIS motor in the foregoing method embodiment, or a device with a camera module with an OIS motor.

The terminal 700 includes a transceiver 701, a processor 702, and a memory 703. The terminal may further include more or fewer components, or combine some components, or have different component arrangements. This is not limited in this application.

The transceiver 701 is configured to receive and send information or data, and perform data transmission with another device in a network. Further, the transceiver 701 may include a transceiver module. The transceiver module may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, such as Wideband Code Division Multiple Access (WCDMA) and/or High Speed Downlink Packet Access (HSDPA). The transceiver module is configured to control communication between the components in the terminal, and can support direct memory access.

As a control center of the terminal, the processor 702 is connected to all parts of the entire terminal by using various interfaces and lines, and performs various functions of the terminal and/or processes data by running or performing a software program and/or unit that are/is stored in the memory 703 and invoking data stored in the memory 703.

Further, the processor 702 may include an integrated circuit (IC), for example, may include a single packaged IC, or may include a plurality of connected packaged ICs that have a same function or different functions. For example, the processor may include only a central processing unit (CPU), or may be a combination of a GPU, a digital signal processor (DSP), an image processor, and a control chip (such as a baseband chip) in the transceiver.

The memory 703 may include a volatile memory, for example, a random access memory (RAM), or may include a non-volatile memory, for example, a flash memory, a hard disk drive (HDD), or a solid-state drive (SSD). The memory may alternatively include a combination of the foregoing types of memories. The memory may store a program or code. The processor 702 can implement functions of the terminal by executing the program or the code.

In this embodiment, functions to be implemented by the transceiver 701 may be implemented by the obtaining unit and the sending unit in the foregoing apparatus embodiment, or may be implemented by the transceiver 701 controlled by the processor 702. Functions to be implemented by each processing module may be implemented by the processor 702.

In addition, this application further provides a computer storage medium. The computer storage medium may store a program, and when the program is executed, some or all of the operations of the embodiments of the lens control method provided in this application may be performed. The storage medium may be a magnetic disk, an optical disk, a read-only memory (ROM), a random access memory (RAM), or the like.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program is loaded and executed on the computer, the procedure or functions according to the foregoing embodiments of this application are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a network node, computer, server, or data center to another station, computer, or server in a wired or wireless manner.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product is stored in a storage medium, such as a ROM/RAM, a magnetic disk, an optical disc and the like, and includes several instructions for instructing a computer device (which may be a personal computer, a server, or a network device and the like) to perform the methods described in the embodiments or some parts of the embodiments of the present disclosure.

For same or similar parts in the embodiments of this specification, mutually refer to these embodiments.

In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have basically the same functions and purposes. A person skilled in the art may understand that the terms such as "first" and "second" do not limit a quantity or an execution sequence, and the terms such as "first" and "second" do not mean being definitely different either.

The foregoing descriptions are embodiments of this application, but are not intended to limit the protection scope of this application.

What is claimed is:

1. A lens control method, comprising:
obtaining, using a camera module, a first speed and a first direction of a to-be-photographed object in a moving process, an object distance between the to-be-photographed object and a movable lens, and an image distance between the movable lens and an imaging sensor, wherein the camera module includes an optical image stabilization (OIS) motor, the movable lens, and an OIS motor driver module, wherein the imaging sensor configured to obtain an image of the to-be-photographed object, wherein the obtaining of the first speed and the first direction further includes: obtaining a first image frame and a second image frame of the to-be-photographed object respectively at a first moment and a second moment, generating a first coordinate set and a second coordinate set respectively from the first image frame and the second image frame, and determining the first speed and the first direction based on the first coordinate set, the second coordinate set, and a time interval t between the first moment and the second moment, wherein the object distance comprises an object distance $d_2$ between the to-be-photographed object and the movable lens at the second moment, and wherein the image distance comprises an image distance v between the movable lens and the imaging sensor at the second moment;

calculating a second speed and a second direction based on the first speed, the first direction, the object distance, and the image distance according to the following relational expression:

$$\vec{V2} = \frac{v}{v+d_2}\vec{V1},$$

wherein $\vec{V2}$ indicates the second speed and the second direction, and $\vec{V1}$ indicates the first speed and the first direction; and sending a control signal to the OIS motor driver module, wherein the OIS motor driver module drives the OIS motor to control the movable lens to move at the second speed and in the second direction.

2. The method according to claim 1,
the first coordinate set is generated from at least one pair of coordinates corresponding to at least one feature point extracted from the first image frame; and
wherein the second coordinate set is generated from at least one pair of coordinates of at least one feature point extracted at a same location from the second image frame.

3. The method according to claim 1, wherein the obtaining of the object distance between the to-be-photographed object and the movable lens and the image distance between the movable lens and the imaging sensor comprises:
controlling the movable lens to automatically focus on the to-be-photographed object; and
obtaining the object distance between the to-be-photographed object and the movable lens after focusing and the image distance between the movable lens and the imaging sensor after focusing.

4. A terminal comprising:
a camera module including a movable lens, an optical image stabilization (OIS) motor driving the movable lens, an OIS motor driver module, and an imaging sensor; and
a processor configured to execute the operations comprising:
obtaining a first speed and a first direction of the to-be-photographed object in a moving process, an object distance between the to-be-photographed object and the movable lens, and an image distance between the movable lens and the imaging sensor, wherein the obtaining of the first speed and the first direction further includes: obtaining a first image frame and a second image frame of the to-be-photographed object respectively at a first moment and a second moment, generating a first coordinate set and a second coordinate set respectively from the first image frame and the second image frame, and determining the first speed and the first direction based on the first coordinate set, the second coordinate set, and a time interval t between the first moment and the second moment, wherein the object distance comprises an object distance $d_2$ between the to-be-photographed object and the movable lens at the second moment, and wherein the image distance comprises an image distance v between the movable lens and the imaging sensor at the second moment;

calculating a second speed and a second direction based on the first speed, the first direction, the object distance, and the image distance according to the following relational expression:

$$\vec{V2} = \frac{v}{v+d_2}\vec{V1},$$

wherein $\vec{V2}$ indicates the second speed and the second direction, and $\vec{V1}$ indicates the first speed and the first direction; and sending a control signal to the OIS motor driver module, wherein the OIS motor driver module drives the OIS motor to control the movable lens to move at the second speed and in the second direction.

5. The terminal according to claim 4, wherein
the first coordinate set is generated from at least one pair of coordinates corresponding to at least one feature point extracted from the first image frame; and
wherein the second coordinate set is generated from at least one pair of coordinates of at least one feature point extracted at a same location from the second image frame.

6. The terminal according to claim 4, wherein the obtaining of the object distance between the to-be-photographed object and the movable lens and the image distance between the movable lens and the imaging sensor comprises:
controlling the movable lens to automatically focus on the to-be-photographed object; and
obtaining the object distance between the to-be-photographed object and the movable lens after focusing and the image distance between the movable lens and the imaging sensor after focusing.

7. A non-transitory computer-readable storage medium, wherein the computer storage medium comprises an instruction, and when the instruction is run on a computer, the computer is enabled to perform the method comprising:
obtaining, using a camera module, a first speed and a first direction of a to-be-photographed object in a moving process, an object distance between the to-be-photographed object and a movable lens, and an image distance between the movable lens and an imaging sensor, wherein the camera module includes an optical image stabilization (OIS) motor, the movable lens, and an OIS motor driver module, wherein the imaging sensor configured to obtain an image of the to-be-photographed object, wherein the obtaining of the first speed and the first direction further includes: obtaining a first image frame and a second image frame of the to-be-photographed object respectively at a first moment and a second moment, generating a first coordinate set and a second coordinate set respectively from the first image frame and the second image frame, and determining the first speed and the first direction based on the first coordinate set, the second coordinate set, and a time interval t between the first moment and the second moment, wherein the object distance comprises an object distance $d_2$ between the to-be-photographed object and the movable lens at the second moment, and wherein the image distance comprises an image distance v between the movable lens and the imaging sensor at the second moment;

calculating a second speed and a second direction based on the first speed, the first direction, the object distance, and the image distance according to the following relational expression:

$$\vec{V2} = \frac{v}{v+d_2}\vec{V1},$$

wherein $\vec{V2}$ indicates the second speed and the second direction, and $\vec{V1}$ indicates the first speed and the first direction; and sending a control signal to a OIS motor driver module, wherein the OIS motor driver module drives a OIS motor to control the movable lens to move at the second speed and in the second direction.

8. The non-transitory computer-readable storage medium according to claim 7, wherein the first coordinate set is generated from at least one pair of coordinates corresponding to at least one feature point extracted from the first image frame; and wherein the second coordinate set is generated from at least one pair of coordinates of at least one feature point extracted at a same location from the second image frame.

9. The non-transitory computer-readable storage medium according to claim 7, wherein the obtaining of the object distance between the to-be-photographed object and the movable lens and the image distance between the movable lens and the imaging sensor comprises:

controlling the movable lens to automatically focus on the to-be-photographed object; and obtaining the object distance between the to-be-photographed object and the movable lens after focusing and the image distance between the movable lens and the imaging sensor after focusing.

* * * * *